O. STINNER.
ARRANGEMENT FOR TRANSMITTING FORCES.
APPLICATION FILED FEB. 14, 1916.

1,277,501.

Patented Sept. 3, 1918.

Witnesses:
Richard Fischer
Anna Fischer.

Inventor:
Otto Stinner

UNITED STATES PATENT OFFICE.

OTTO STINNER, OF LICHTENBERG, NEAR BERLIN, GERMANY.

ARRANGEMENT FOR TRANSMITTING FORCES.

1,277,501.

Specification of Letters Patent.

Patented Sept. 3, 1918.

Application filed February 14, 1916. Serial No. 78,303.

*To all whom it may concern:*

Be it known that I, OTTO STINNER, residing at Lichtenberg, near Berlin, Germany, have invented certain new and useful Improvements in Arrangements for Transmitting Forces, of which the following is a specification.

The present invention relates to an arrangement for transmitting power by aid of balls; the object of the invention is to utilize the mass of the said balls for producing as large a power as possible and for reducing the frictional resistance caused by the contact of the balls.

I attain this object by means of the mechanism shown in the accompanying drawing, in which—

Figure 1:
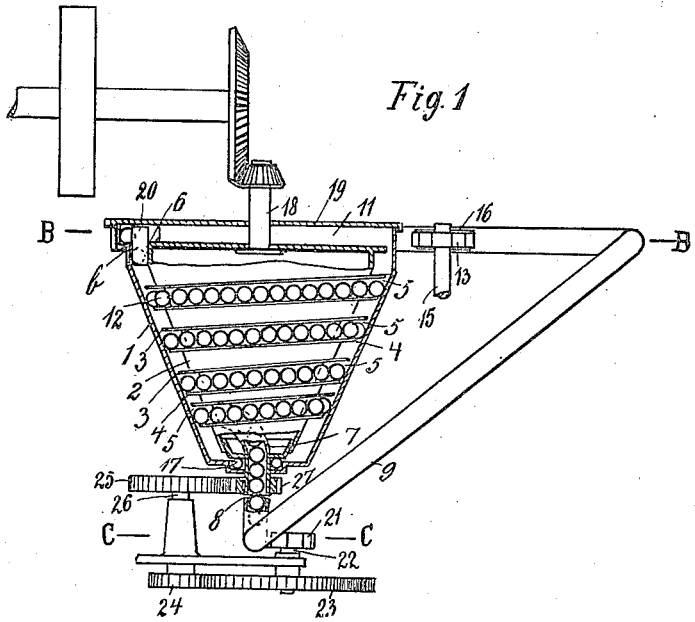
Figure 2:
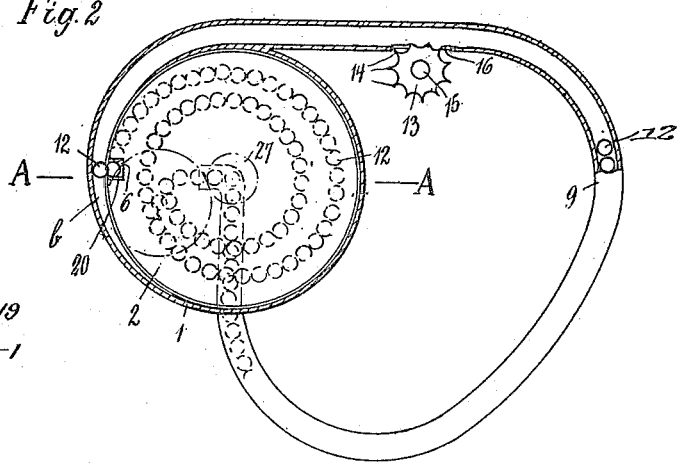
Figure 4:
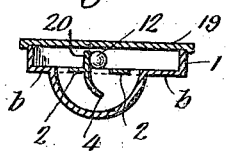
Figure 3:
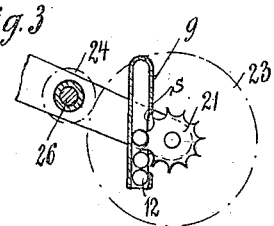

Figure 1 is a longitudinal section on the line A—A in Fig. 2, Fig. 2 a section on the line B—B in Fig. 1, Fig. 3 a section on the line C—C in Fig. 1 and Fig. 4 a section on the line D—D in Fig. 2.

In a stationary funnel shaped casing 1 a cone 2 is revolubly disposed. On the mantle of said cone 2 oblique walls 3 and 4 are provided. These walls 3 and 4 inclose a helical raceway which opens above at 6 and communicates below with a tube 7 attached to the cone 2, said tube 7 passing downward through the axis of the cone. The tube 7 terminates close in front of the mouth of a stationary tube 9 which extends tangentially from the cavity 11 of the casing 1 and in a smooth curve to the tube 7.

The raceway 5 of cone 2 and the tube 7 are filled completely with balls 12, whereas the tube 9 is filled with balls only up to the level of the cavity 11. The tube 9 forms a closed raceway for the balls 12. The balls 12 are preferably inserted into the tube 9 from the cavity 11. In the latter a spirally enlarged partition b is provided in front of the mouth of tube 9 said partition leading to the tube 9. If necessary, a number of balls 12 may also be inserted from above into the tube 9. Between the mouth of tube 9 at the cavity 11 and the last ball in tube 9 a certain length of the tube will remain free from balls. Into this length of the tube 9 the pointed teeth 14 of a wheel 13 project through a slot 16 in tube 9 into the path of the balls. The said wheel 13 is fitted to a shaft 15.

The cone 2 is fitted on a ball bearing 17 and connected to a shaft 18, which is driven by suitable means. The casing 1 is closed at the top by means of a lid 19. At the opening 6 of the cone 2 a dog 20 for the balls 12 is fitted.

Into a slot s of the tube 9 engages a feeder wheel 21, which is driven by aid of a gearing from the cone 2. The said countershaft gearing is composed of a gear 23 coupled by shaft 22 with the feeder wheel, gears 24 and 25 fitted to a shaft 26 and a gear 27 meshing with gear 25 and fitted to the tube 7.

The operation of the arrangement is as follows:

When the cone 2 revolves, the walls 3 and 4 of the raceway carry the balls 12 with them and accelerate the travel of the latter. The more rapidly the cone 2 is revolved, the greater will be the centrifugal force of the balls. Under the action of this centrifugal force the balls 12 tend to run upward on the oblique inner wall of the casing 1. In doing so they are conducted by the raceway of the cone 2. The balls will successively emerge from the revolving raceway 5 into the cavity 11 of the casing 1. The rotating cone 2 will discharge the balls one after the other. This is accomplished by means of the dog or flap 20 arranged upon the said cone near the opening 6 of the same. When the cone is rotated, the flap 20 pushes one ball in a circle along the wall of the cavity 11. Then the centrifugal force will move the ball to run upon the partition b having the form of a shoulder arranged in the said cavity at the wall of the casing 1. This shoulder b provided in front of the outlet of the cavity 11 will lead the ball into the said outlet. The ball passing the outlet enters the tube 9 with a maximum velocity and transmits its energy to the wheel 13 and will rotate the same. The ball having passed the wheel enters the inclined portion of tube 9, in which gravity will move the ball in the direction to the feeder wheel 21. The wheel 21 revolves at such a speed that each revolution of cone 2 corresponds with a rotation of the wheel 21 by one tooth. It is thereby obtained that at each revolution of the cone 2 one ball is fed to it.

The balls are driven in such a manner that they develop a centrifugal force and rise by the latter by themselves to the discharge mouth into the cavity 11. They represent bodies which, when set in motion, will accumulate energy, whereupon they travel singly as independent drivers by their own kinetic energy through a space of constant length in tube 9 at the end of which their energy is relieved and utilized.

I claim:

1. In an arrangement for transmitting forces, the combination of balls with a wheel, a raceway for the balls, projections at the periphery of said wheel, the projections partly projecting into the raceway for the said balls, a revoluble member to give a centrifugal impetus to the balls, means to discharge the balls from the said revoluble member and to make them strike against the said projections of the wheel and a shaft driven by the said wheel.

2. In an arrangement for transmitting forces, the combination of a funnel-shaped casing with balls, a raceway for the said balls attached to the outlet of the casing, a wheel, projections at the periphery of the said wheel, the projections partly projecting into the said raceway, a member revolubly disposed in the said casing to give a centrifugal impetus to the balls, means to discharge one ball after the other from the said revoluble member and to make it strike against one of the projections of the wheel, and a shaft driven by the said wheel.

3. In an arrangement for transmitting forces, the combination of balls with a funnel-shaped casing, a raceway for the balls attached to the outlet of the casing, a wheel, projections at the periphery of the said wheel, the said projections partly projecting into the said raceway, a cone rotatably mounted in the said casing, a helically formed path for the balls arranged at the periphery of the cone, a flange arranged at the basis of the said cone, a cavity of the casing arranged above the said flange, a passage in the flange forming the outlet of the said path, a flap arranged upon the said flange to give a centrifugal impetus to the balls one after the other, a shoulder of the casing to direct the said balls from the cone to the outlet of the casing, and a shaft driven by the said wheel.

4. In an arrangement for transmitting forces, the combination of a funnel-shaped casing with balls, a raceway for the said balls attached to the outlet of the casing, a wheel, projections at the periphery of the said wheel, the said projections partly projecting into the said raceway, a cone revolubly disposed in the casing to give a centrifugal impetus to the said balls, means to discharge the balls from the cone, a hollow shaft attached to the said cone to lead the balls from the said raceway to the periphery of the cone.

5. In an arrangement for transmitting forces, the combination of a funnel-shaped casing with balls, a raceway for the said balls attached to the outlet of the casing, a wheel, projections at the periphery of the said wheel, the said projections partly projecting into the said raceway, a cone revolubly disposed in the said casing to give a centrifugal impetus to the said balls, a shaft driven by the said wheel, a hollow shaft attached to the said cone to lead the balls from the said raceway to the periphery of the cone, a feeder wheel engaging into the said raceway to feed the balls into the hollow shaft, a pinion coupled with the said feeder wheel and a gearing engaging into the said pinion and the said toothed wheel to drive the feeder wheel.

In testimony whereof I have affixed my signature in presence of two witnesses.

OTTO STINNER.

Witnesses:
HENRY HASPER,
ALICE MARGARET SAABY.

Copies of this patent may be obtained for five cents each, by addressing the "Commissioner of Patents Washington, D. C."